United States Patent [19]

Southgate et al.

[11] Patent Number: 4,498,779
[45] Date of Patent: Feb. 12, 1985

[54] AUTOMATIC STRIPE WIDTH READER

[75] Inventors: Peter D. Southgate, Princeton; David W. Fairbanks, Monmouth Junction; Richard B. Davis, Trenton; John P. Beltz, Willingboro, all of N.J.

[73] Assignee: RCA Corporation, New York, N.Y.

[21] Appl. No.: 72,429

[22] Filed: Sep. 4, 1979

[30] Foreign Application Priority Data

Jan. 10, 1979 [GB] United Kingdom ............... 7900923

[51] Int. Cl.³ .................................. G01B 11/02
[52] U.S. Cl. ........................................... 356/384
[58] Field of Search ............ 356/372, 384–387, 356/379–380; 250/560, 578; 358/106–107; 364/560–563

[56] References Cited

U.S. PATENT DOCUMENTS

| | | | |
|---|---|---|---|
| 2,999,944 | 9/1961 | Laycak | 364/563 |
| 3,558,310 | 1/1971 | Mayaud. | |
| 3,578,906 | 5/1971 | Holmstrom et al. | 358/107 |
| 3,609,307 | 9/1971 | Totsuka et al. | 364/561 |
| 3,889,117 | 6/1975 | Shaw, Jr. | 250/578 |
| 3,909,602 | 9/1975 | Micka | 356/392 |
| 4,148,065 | 4/1979 | Nakagawa et al. | 358/107 |
| 4,156,563 | 5/1979 | Kato et al. | 250/201 |
| 4,185,298 | 1/1980 | Billet et al. | 358/106 |

OTHER PUBLICATIONS

Williams, E. R., "Two Dimensional Image Sensor Using One-Dimensional Sensor Array", *IBM Tech. Disc. Bull.*, 7-1978, pp. 436–437.

Primary Examiner—William H. Punter
Attorney, Agent, or Firm—Eugene M. Whitacre; Glenn H. Bruestle; Dennis H. Irlbeck

[57] ABSTRACT

A system is provided for determining the widths and spacings of substantially parallel opaque stripes on a substrate, wherein the stripes are separated by openings. The system comprises a light source for illuminating the substrate and photodetecting means positioned to receive light from the illuminated substrate. Means are included for scanning the photodetecting means transverse to the stripes and for sweeping the photodetecting means in a direction substantially parallel to the stripes. The system further includes means for converting the output of the photodetecting means into a quantized signal, means for dividing the quantized signal into separate signals representing stripe widths and opening widths between stripes, and means for converting the stripe width and opening width signals into a signal representing center-to-center spacing between openings.

5 Claims, 10 Drawing Figures

AUTOMATIC STRIPE WIDTH READER

BACKGROUND OF THE INVENTION

This invention relates to measurement of the widths of stripes and spacings between stripes in a regular periodic pattern, and particularly to a reader for performing such measurements.

Although the present invention may be used to read the widths of many different types of regular periodic patterns, it hereinafter will be described with respect to reading the widths of opaque, light absorbing lines on a color picture tube faceplate panel of the matrix type before application of phosphor elements of a viewing screen.

Color picture tubes of the line screen matrix type have been commercially available for several years. The screens of such tubes comprise alternating lines of red, green and blue light-emitting phosphors, each separated from the other by light absorbing stripes called the matrix. In forming the tube screen, the matrix is applied first to the inner surface of a tube faceplate panel and then the phosphor lines are applied. The matrix and the phosphor lines are formed in a photographic process which uses the shadow mask of the tube as a photomaster. Each color-emitting set of phosphor elements requires a different light source location to ensure placement of the elements at locations that will be struck by electrons from an associated electron gun. Since the matrix is applied before the phosphor elements are applied, formation of the matrix requires three separate exposures to ensure that the holes in the matrix for the phosphors are in the proper locations. Because of this multiexposure method, the width of the matrix stripes and the spacing between stripes may vary from the ideal width and spacing desired. Since light output and color purity are at least partially dependent on the matrix stripe width and spacing, it is advantageous to determine this stripe width and spacing prior to completion of a screen.

SUMMARY OF THE INVENTION

A system is provided for determining the widths and spacings of substantially parallel opaque stripes on a substrate, wherein the stripes are separated by openings. The system comprises a light source for illuminating the substrate and photodetecting means positioned to receive light from the illuminated substrate. Means are included for scanning the photodetecting means transverse to the stripes and for sweeping the photodetecting means in a direction substantially parallel to the stripes. The system further includes means for converting the output of the photodetecting means into a quantized signal, means for dividing the quantized signal into separate signals representing stripe widths and opening widths between stripes, and means for converting the stripe width and opening width signals into a signal representing center-to-center spacing between openings.

DETAILED DESCRIPTION

Figure 1:
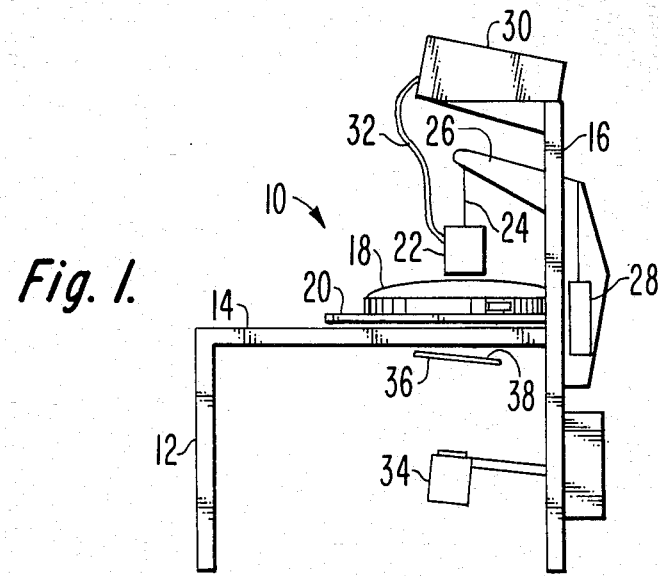
FIG. 1 is a side view of the general physical structure of a stripe width reader.

FIG. 1 illustrates the general physical arrangement of a stripe width reader 10. Various reader components are located on a chair-like stand 12 having a table section 14 and a vertical extension 16. A faceplate panel 18 is shown positioned on the table section 14 on a sliding tray 20. The panel 18 is held on the tray 20 by movable jaws, not shown. The tray 20 may be clamped in positions which determine the area of the panel 18 to be measured. A camera unit 22 is suspended directly above the panel 18 by a cable 24 which passes through pulleys on an arm 26 which is attached to the vertical extension 16. Vertical position of the camera unit 22 is controlled by a hydraulic mechanism 28 acting on the cable 24. For a stripe width reading, the hydraulic mechanism 28 lowers the camera unit 22 until it touches the surface of the panel 18. Camera control electronics 30 are located at the top of the vertical extension 16 and are connected to the camera unit 22 by electrical leads 32.

The panel 18 is illuminated from below by an incandescent light source 34. Light from the source 34 passes through a Fresnel lens 36 which acts as a condenser for focusing light onto the camera. This lens 36 is large enough to accommodate the camera field of view taking into account the variable angle at which the camera may rest on the panel. A filter 38 also is included on the lens 36 to cut out any infrared component which would cause a deterioration of image resolution.

The sensitive element in the camera unit 22 is a 1728 element line-scan photodiode array with elements spaced by 15 μm. The matrix image is magnified about 7 times so the array scans a line about 0.14 inch (3.556 mm) long. The image is deflected across the array, in a direction perpendicular to the array direction, by a rotatable mirror. The effective distance swept on the matrix during measurement is about 0.1 inch (2.54 mm). Width measurements made on the video signal during the sweep time are aggregated to form an average width value as described later.

Figure 2:
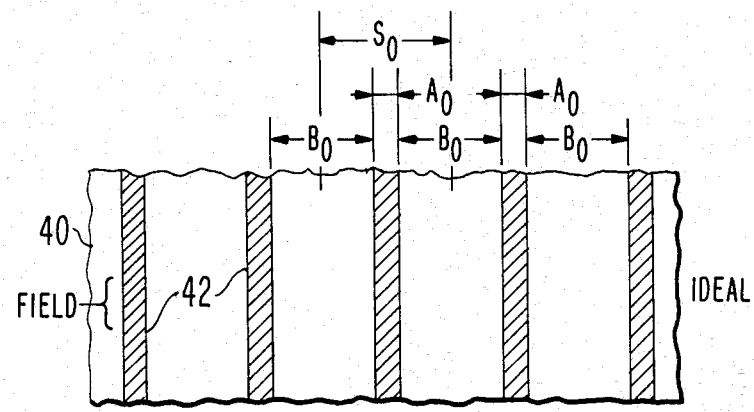
FIG. 2 is a partial plan view of a tube faceplate having an ideal matrix pattern thereon.
Figure 3:
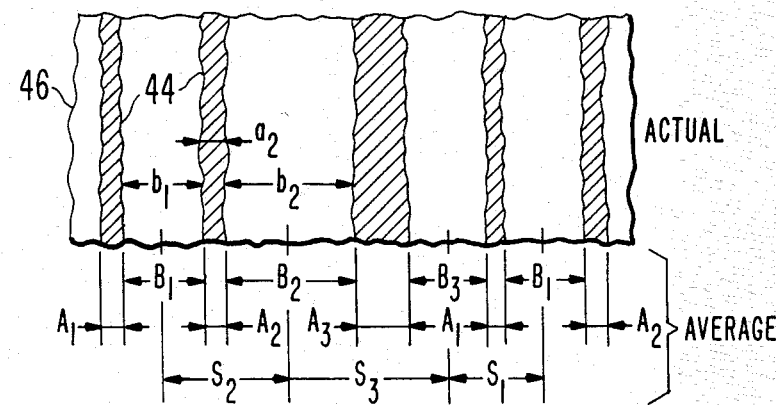
FIG. 3 is a partial plan view of a tube faceplate having an actual matrix pattern thereon.

FIG. 2 shows a portion of a transparent faceplate panel 40 having ideally spaced and shaped matrix stripes 42 thereon. Matrix stripe width is designated $A_o$, the spacing between stripes 42 is designated $B_o$ and the repeat distance, which is the same as $A_o$ plus $B_o$, is designated $S_o$. Unfortunately, the ideal is never achieved but rather the matrix stripe pattern varies both in spacing and in stripe width as shown in the actual embodiment of FIG. 3. In this embodiment, the average widths of the matrix stripes 44 on the faceplate panel 46 are designated $A_1$, $A_2$ and $A_3$, the average spacings between stripes are designated $B_1$, $B_2$ and $B_3$ and the average matrix spacings measured from the center of one open space to the next are designated $S_1$, $S_2$ and $S_3$.

A major source of these stripe width and stripe spacing variations is error in the setting or exposure of the three separate light-houses which are used to form each of the three aperture fields in the matrix of stripes. Details of a method of making a cathode-ray tube screen having a matrix background of light absorbing areas may be found in U.S. Pat. No. 3,558,310 issued to E. E. Mayaud on Jan. 26, 1971. Since the variations in each set of stripes formed with the same lighthouse are similar, (each lighthouse forming every third stripe) it is useful to group together measurements of the widths of openings in a given field even though these measurements are taken on different stripes. The method, therefore, is to aggregate all measurements of $A_1$, all of $B_1$, etc., taken during the camera sweep. This aggregate is then scaled to give a read-out in volts corresponding to the average width in mils.

Figure 4:
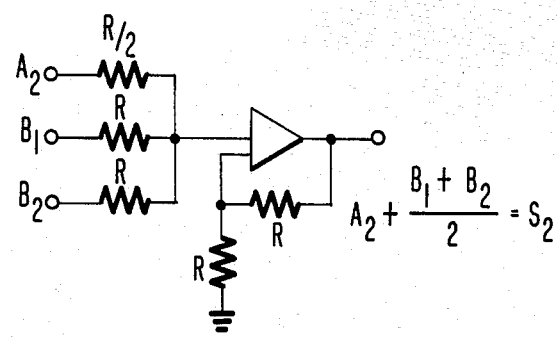
FIG. 4 is a circuit diagram for calculating spacing distances $S_n$ from inputs related to stripe width $A_n$ and the spacings between stripes $B_n$.

The parameter of display chosen is not of average matrix stripe spacing B but of average repeat distance S, which can be more directly interpreted in terms of lighthouse maladjustment. Derivation of S values from A and B is accomplished by the circuit shown in FIG. 4, wherein inputs $A_2$, $B_1$ and $B_2$ are used to obtain output $S_2$. In addition, the width integrators are initialized at the (negative) desired or target value, so that the final values obtained represent deviations from the target values. Target values are appropriately preset into the circuitry.

Figure 5:
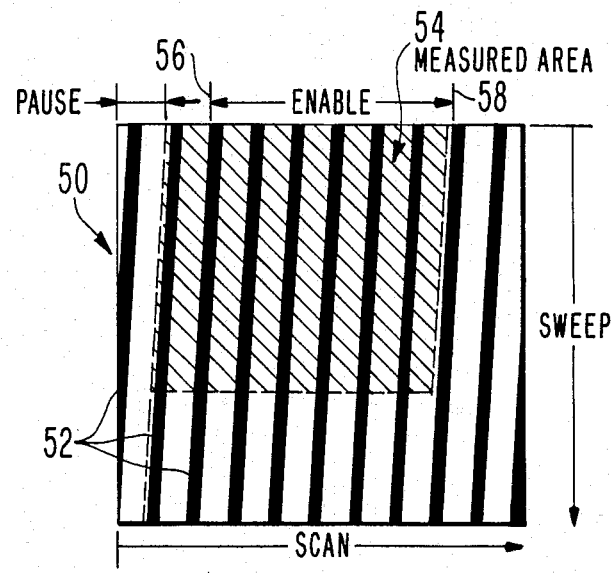
FIG. 5 is a small portion of a tube faceplate panel having a stripe pattern thereon with an overlay showing the area of the panel to be measured.

FIG. 5 shows a small portion 50 of a tube faceplate panel having a light absorbing matrix stripe pattern 52 thereon but no phosphor lines. The smaller shaded area 54 represents the area to be measured by the present stripe width reader. In the figure, the scan direction of the photodiode array is left to right and the sweep direction of the camera is from top to bottom. Each scan begins with a pause before information is gathered. Following the pause, information is not used until the leading edge 56 of the second stripe within the measured area is reached. Information to be processed is obtained during the scan over the next six stripes and the enable cycle ends at the leading edge 58 of the seventh stripe.

Figure 7:
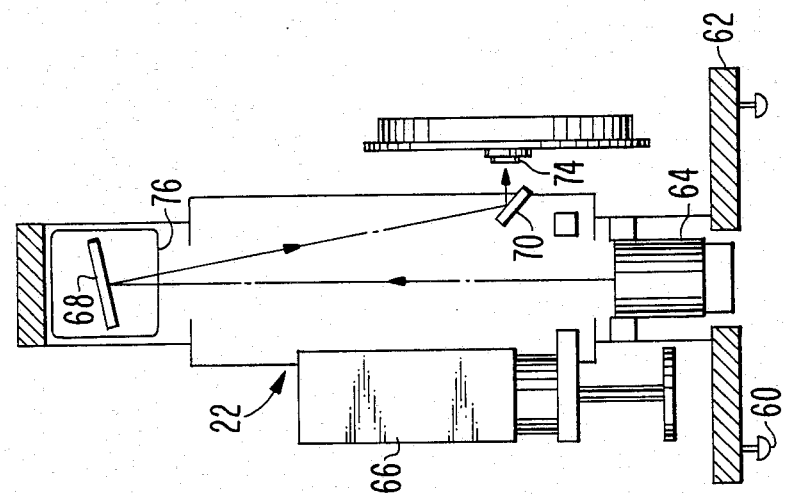
FIGS. 6 and 7 are a front view and a cutaway side view, respectively, of a camera unit.
Figure 6:
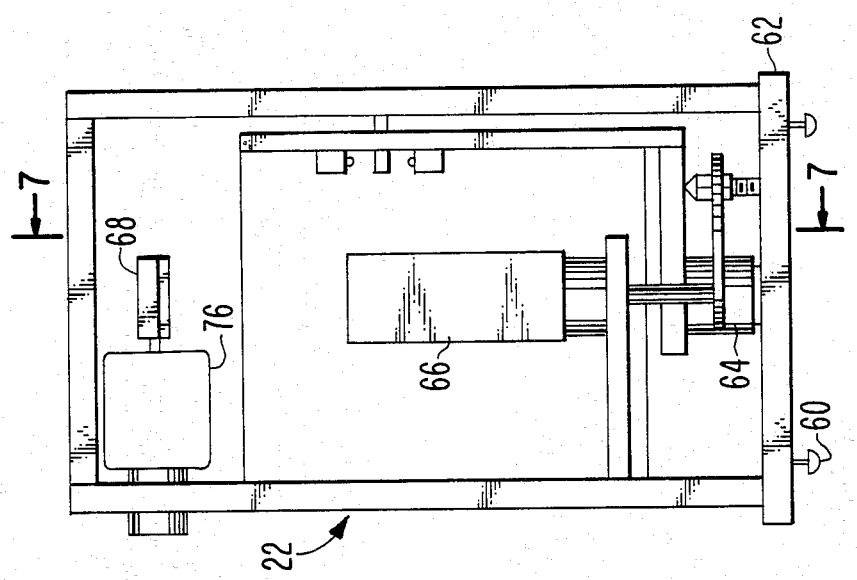

FIGS. 6 and 7 show the details of the camera unit 22. Three seating pads 60 extend from a base 62 of the unit 22 to contact the surface of a faceplate. Principal elements of the unit include a lens 64 for focusing the light from the light source 34 and a focus motor 66 for moving the lens 64 to its focused location. Light passing through the lens 64 is reflected by two mirrors 68 and 70 onto a detector array 74. The first of the two mirrors 68 is attached to a sweep mirror drive 76 which rotates the mirror 68 thereby moving the line viewed by the scanning array in the sweep direction shown in FIG. 5.

Figure 8:
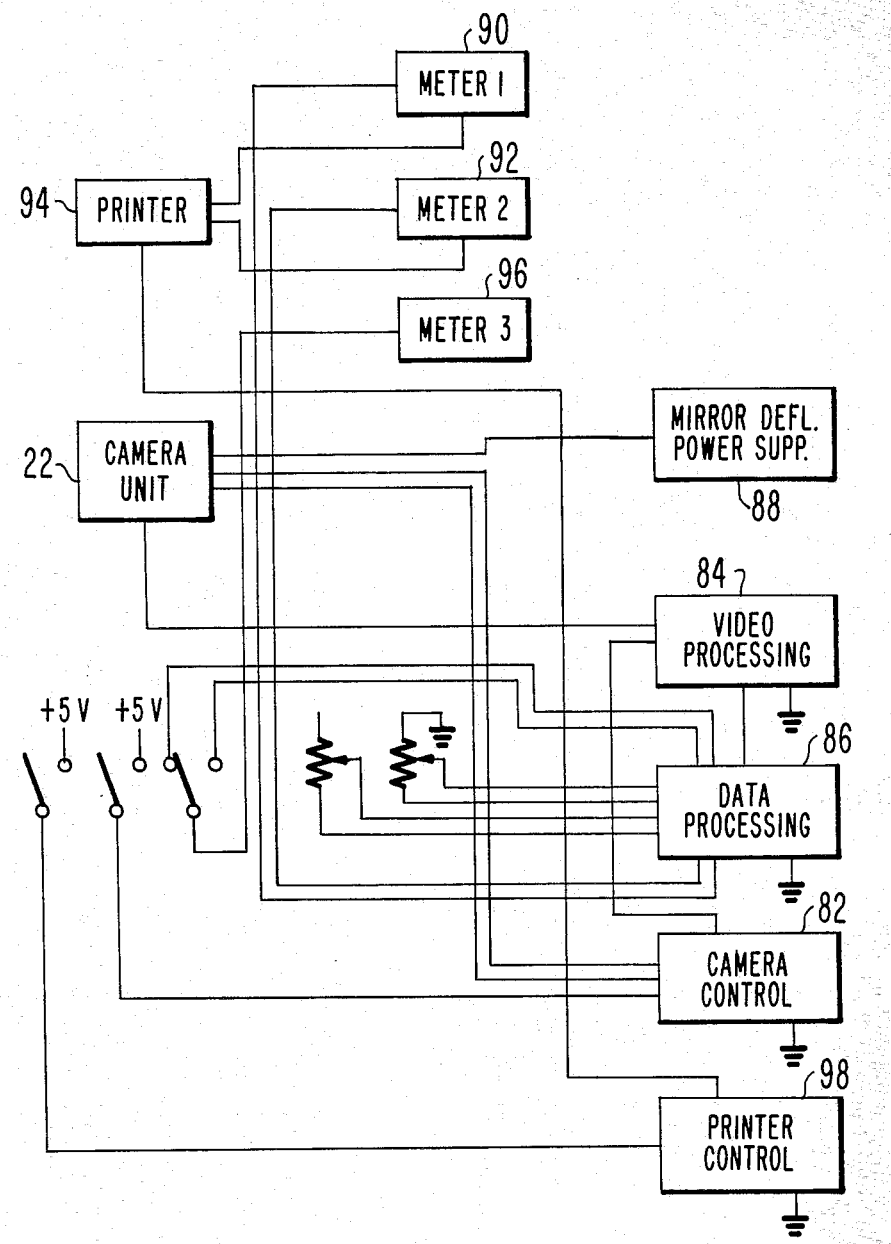
FIG. 8 is a circuit diagram showing the interconnection of circuits in the present stripe width reader.

The electrical connections between the various components of the present stripe width reader are shown in FIG. 8. The camera unit 22 is controlled by the camera control circuit 82. The first function of this circuit 82 is to focus the lens 64 after the camera unit 22 has been placed on a faceplate panel. The focus motor 66 is provided with two speeds. One is a fast focus speed which continues until the lens 64 is nearly in focus. The other is a slower speed used to bring the lens into final focus. To perform this focusing, a video processing circuit 84 generates a signal from the detector array 74 output which is proportional to the sharpness of the video signal. This signal then is fed to the camera control circuit 82.

Once the camera unit 22 is focused, the detector array 74 scans the faceplate panel and the output is sent to a data processing circuit 86 via the video processing circuit 84. During these scans, a mirror deflection power supply 88 feeds a constantly increasing current to the sweep mirror drive 76 causing the mirror 68 to rotate continuously so that each scan is slightly displaced from the previous one. This procedure continues until information is obtained from the entire measured area 54 previously shown in FIG. 5.

The data processing circuit 86 provides six outputs sequenced in pairs, $S_n$ and $B_n$, to two meters 90 and 92. The meters 90 and 92 contain analog-to-BCD (binary coded decimal) converters, the outputs from which are fed to a printer 94. Two digits and a sign for each output give sufficiently accurate indication of the deviation from the desired or target values of S and B. A third meter 96 indicates target values of $B_o$ and $S_o$. Printer operation is sequenced by a printer control circuit 98.

Figure 9:
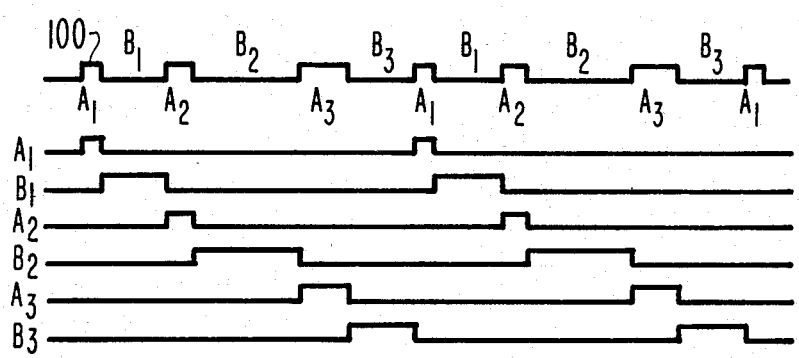
FIG. 9 shows waveforms of quantized signals related to stripe widths and stripe spacings.

The primary function of the video processing circuit 84 is to take the charge pulses from the detector array 74 and convert them into a quantized signal. The top waveform 100 of FIG. 9 shows this quantized signal. The next function performed by the video processing circuit 84 is to gate the combined waveform to obtain quantized signals for the various stripes, $A_1$, $A_2$ and $A_3$ and openings $B_1$, $B_2$ and $B_3$, as shown by the six lower waveforms of FIG. 9. These individual waveforms are used as inputs to the data processing circuit 86 shown in detail in FIG. 10.

Figure 10:
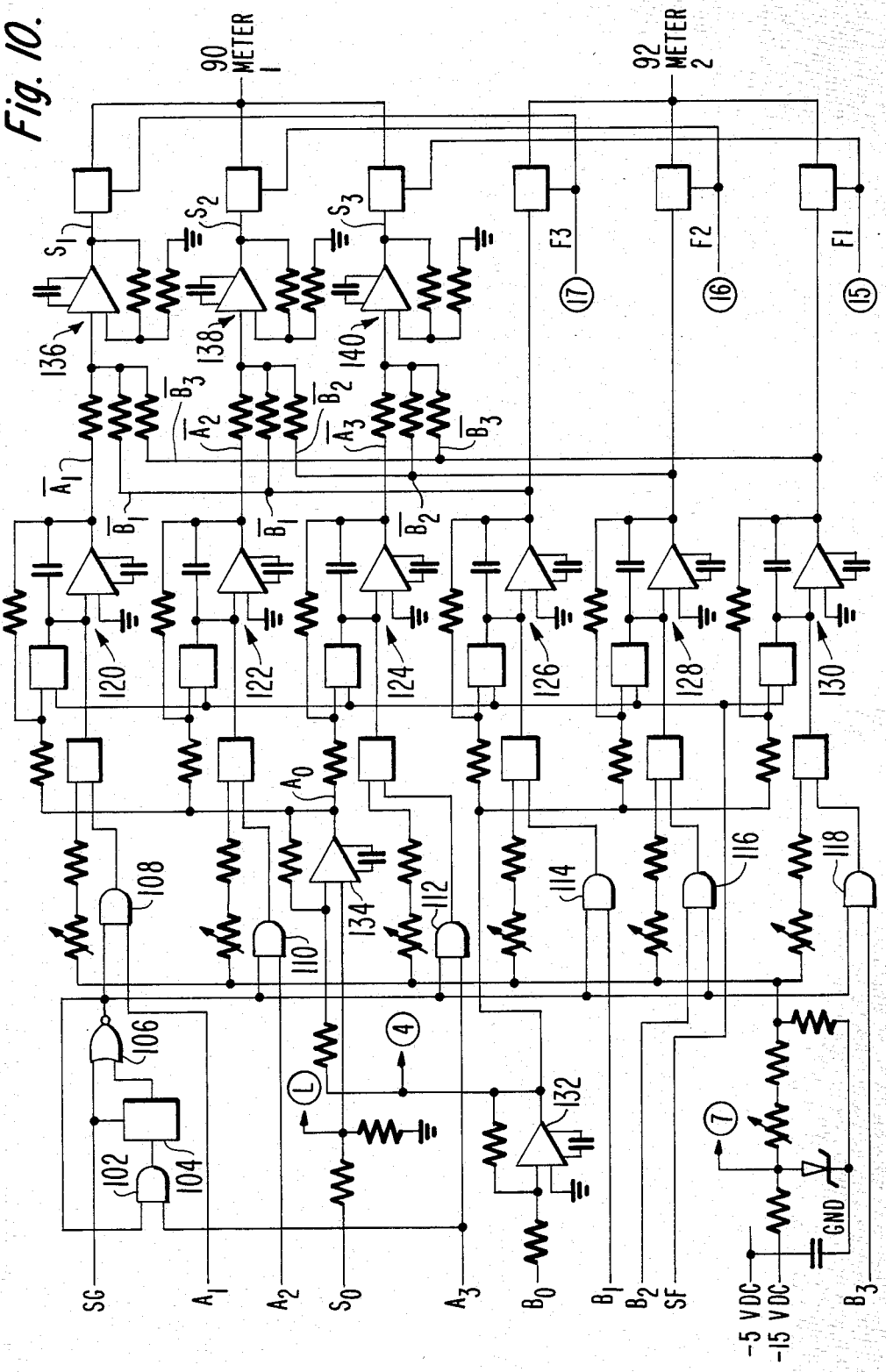
FIG. 10 is a diagram of a data processing circuit.

The data processing circuit 86 of FIG. 10 comprises four basic parts: a switch section, an integrator section, a reference section, and a spacing calculation section. The switch section includes an AND gate 102, a counter 104 and a NOR gate 106 which provide one of the inputs to each of six AND gates 108, 110, 112, 114, 116 and 118. The other inputs to these six AND gates are the stripe width waveforms $A_1$, $A_2$ and $A_3$ and the opening waveforms $B_1$, $B_2$ and $B_3$ from the video processing circuit 84. Individual pulse trains of each waveform next are summed in the integrator section comprising six integrators 120, 122, 124, 126, 128 and 130 including their associated capacitors and resistors. The aiming (DC bias) voltage of the integrators is arranged so that a pulse length corresponding to a specific stripe width (e.g., 10 mils) gives a specific change on the integrator (e.g., 1 volt). Individual variations in the capacitors are compensated by trimming resistors. Outputs from the integrators 120, 122 and 124 are averages $\overline{A}_1$, $\overline{A}_2$ and $\overline{A}_3$ of the stripe width values and outputs from the integrators 126, 128 and 130 are averages $\overline{B}_1$, $\overline{B}_2$ and $\overline{B}_3$ of the opening widths. Alternatively, the outputs may be preset to the desired values of stripe width $A_o$ and opening width $B_o$. Thus, after summing, the outputs of the integrators will be the deviations of the measured average values from the desired or target values which is a more convenient form of output. The target values are supplied by the reference section comprising the two amplifiers 132 and 134. Finally, the values of $A-A_o$ and $B-B_o$ are combined in the spacing calculation section comprising the three networks 136, 138 and 140, previously described with respect to FIG. 4, to give $S-S_o$ values on the outputs from the networks. The outputs from the three networks 136, 138 and 140 are thereafter sequentially applied to the meter 90.

We claim:
1. A system for determining the spacings between opaque stripes forming a light absorbing matrix on a color picture tube faceplate wherein the matrix has been formed by photoexposing the areas between the stripes in three separate exposures, said system comprising, means for illuminating said faceplate, photodetecting means positioned to receive light from said means for illuminating, means for scanning said photodetecting means transversely across at least six stripes, means for sweeping said photodetecting means in a direction substantially parallel to said stripes, means for converting the output of said photodetecting means into a quantized signal, means for dividing said quantized signal into separate signals representing stripe widths and opening widths between stripes, means for accumulating stripe width and opening width signals associated with a particular exposure, and means for converting the accummulated stripe width and opening width signals into three signals representative of corrections to be made in the three photoexposing steps.

2. The system as defined in claim 1 including means for providing signals related to target values of stripe width and opening width to said system.

3. The system as defined in claim 2 including means for taking the difference between said signals related to target values and the signals related to measured stripe and opening width.

4. The system as defined in claim 3 wherein the difference in signals is provided to said means for converting and the resulting signal represents deviation in center-to-center spacing between openings from a target value.

5. The system as defined in claim 1 wherein said photodetecting means is a solid state line scanner.

* * * * *